N. STEDMAN.

Pump Piston.

No. 3,899. Reissued March 29, 1870.

Witnesses:
Charles L. Fisher.
P. J. Baldauff

Inventor:
N. Stedman
per Fmij

N. PETERS, Photo-Lithographer, Washington, D. C.

United States Patent Office.

NEW ENGLAND PUMP-MANUFACTURING COMPANY, OF BOSTON, MASSACHUSETTS, PACIFIC PUMP-MANUFACTURING COMPANY, OF SAN FRANCISCO, CALIFORNIA, CHARLES F. MUDGE, OF BRIDGEPORT, AND BRIDGEPORT MANUFACTURING COMPANY, OF BRIDGEPORT, CONNECTICUT, ASSIGNEES, BY MESNE ASSIGNMENTS, OF NATHAN STEDMAN.

*Letters Patent No.* 41,543, *dated February* 9, 1864; *reissue No.* 3,899, *dated March* 29, 1870.

IMPROVEMENT IN PUMP-PISTONS.

The Schedule referred to in these Letters Patent and making part of the same.

*To all whom it may concern.*

Be it known that the following is a full, clear, and exact description of a new and useful Improvement in Pumps, by NATHAN STEDMAN, of Aurora, in the county of Dearborn and State of Indiana, reference being had to the accompanying drawing making part of this specification.

This invention is chiefly designed for that class of pumps which has a hollow piston-rod, that is also made to form the exit or discharge-pipe; and Said invention consists in a peculiar construction of hollow piston with a side opening in or through it for insertion of a double-acting valve, that serves to open and close alternately apertures in or through the opposite faces of the piston.

In the accompanying drawing—

Figure 1:
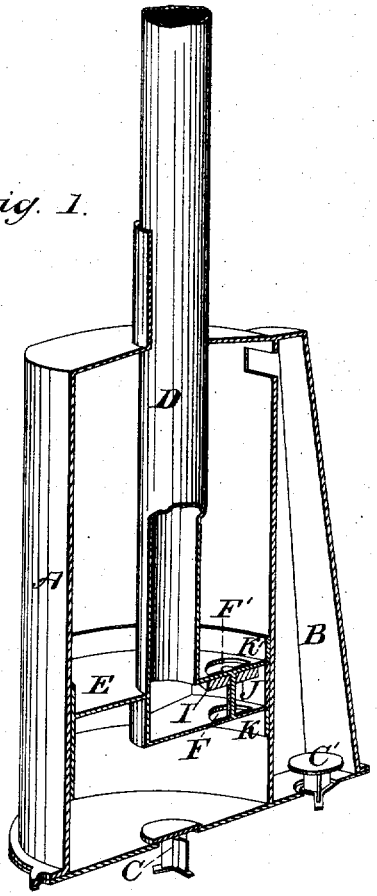

Figure 1 represents a sectional perspective view of the pump, and

Figure 2:
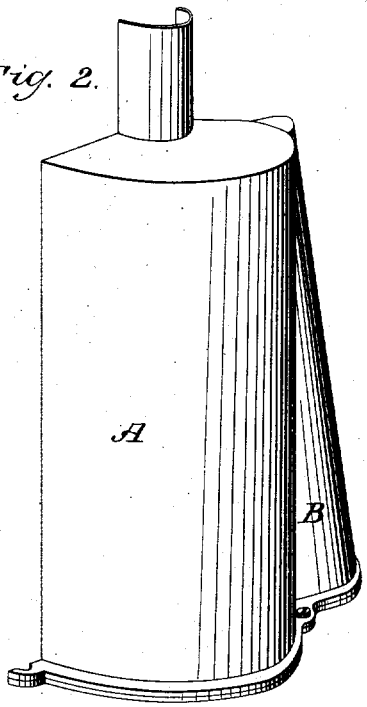

Figure 2, a view in perspective of the portion of the barrel removed in fig. 1.

Figure 3:
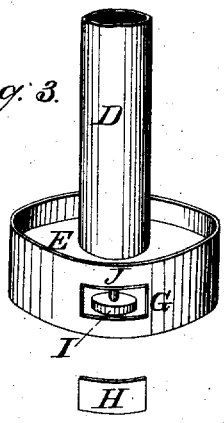

Figure 3, a view of the piston detached, and

Figure 4:
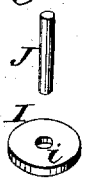

Figure 4, a view of the valve that plays within the piston and guide-rod thereto, detached.

The cylinder or barrel A, side passage B, induction-valves C and C′ and hollow piston-rod D may be of the construction customary in this class of pumps.

The hollow piston E has a valve-aperture, F, through its one face, and a similar aperture, F′, in line with the first-named aperture, through its opposite face. Said hollow piston E has also an aperture, G, through its side, which, immediately previous to the insertion of the piston into the barrel, may be closed by a cap or plug, H, shown at foot of fig. 3. This aperture G allows of the insertion, with facility and despatch, of the valve within the piston. This valve is of a double-acting character, so as to open and close alternately the apertures F F′ in the opposite faces of the piston as the latter is reciprocated within the barrel. Said valve is here shown as made of a disk, I, of caoutchouc, or other suitable material, and which, after insertion, may be secured in place and guided in its throw by a rod, J, that is passed through an eye, *i*, in the center of the disk, and which may afterward be secured by riveting it on the outside of bridges K and K′.

Although India rubber is here named as the material of which the valve I may be composed, metallic or other valves having a double-acting character relatively to the apertures F F′ may be used. These apertures F F′, it will be observed, are in communication, when uncovered by the valve, with the interior of the piston and its hollow rod D, whereby a continuous discharge is kept up.

It will also be observed that, by constructing the piston with an aperture or passage in or though its side, the valve may be readily inspected by simply withdrawing the piston from the pump-barrel; and, further than this, the piston may, by reason of its being provided with a side aperture or passage, through or into which the valve may be inserted, be cast in one piece, thereby saving in cost of construction, and insuring durability and strength; whereas, hollow pistons of this character have heretofore been made in two or more parts, which, after the valve or valves have been placed inside, are secured together by screws or bolts, and consequently are more liable to get out of order, and are more complicated in their construction, and require more skilled labor in their manufacture.

What is here claimed, and desired to be secured by Letters Patent, is—

1. The hollow reciprocating piston E, constructed with an opening, G, in or through its side, and provided with a double-acting valve, arranged to open and close alternately apertures in or through opposite faces of the piston, substantially as specified.

2. A hollow piston for pumps, provided with a side opening, G, and a discharge-pipe D, substantially as herein described.

3. A hollow piston for pumps, provided with the ports F F′ and a side opening, G, substantially as herein described.

4. The combination of the cap H with the piston E, so arranged as to close the opening G, substantially as herein described.

5. The combination of the hollow piston E, provided with the ports F F′, passage G, discharge-pipe D, and reciprocating valve I, with the pump-barrel A B, provided with the valves *c c′*, constructed, arranged, and operating substantially as herein described.

JAMES WILSON.
CHARLES F. MUDGE.

Witnesses:
J. E. WILSON,
R. SHELDEN.